Sept. 29, 1925.

F. C. TISCHHAUSER

CHEESE PRESS

Filed March 9, 1925      2 Sheets-Sheet 1

1,555,722

Inventor
F.C. Tischhauser,

By John D. ____
Attorney

Sept. 29, 1925.

F. C. TISCHHAUSER 1,555,722

CHEESE PRESS

Filed March 9, 1925 — 2 Sheets-Sheet 2

Inventor
F. C. Tischhauser,
By
Attorney

Patented Sept. 29, 1925.

1,555,722

UNITED STATES PATENT OFFICE.

FREDRICK C. TISCHHAUSER, OF EDWARDSVILLE, ILLINOIS, ASSIGNOR OF ONE-ELEV-ENTH TO IRA VOYLES, ONE-ELEVENTH TO NOEL HOYLE, ONE TWENTY-SECOND TO JAMES JAMIESON, AND ONE TWENTY-SECOND TO JOHN YESNOSKY, ALL OF ED-WARDSVILLE, ILLINOIS.

CHEESE PRESS.

Application filed March 9, 1925. Serial No. 14,057.

*To all whom it may concern:*

Be it known that FREDRICK C. TISCH-HAUSER, a citizen of the United States, residing at Edwardsville, in the county of Madison and State of Illinois, has invented certain new and useful Improvements in Cheese Presses, of which the following is a specification.

This invention relates to new and useful improvements in vats or drains for separating cottage cheese from the whey and is especially designed as an improvement in the construction shown in my copending application for presses, Serial Number 730,881.

Among the many advantages derived through the use of my present invention, some of the more important may be briefly enumerated as follows:—

First: The device is more sanitary and more easily cleaned.

Second: It is portable and may be easily and conveniently moved from place to place by the operator.

Third: Improved means are provided for supporting the cheese cloth or sack.

Fourth: Improved and simplified means are provided for lifting the cheese at occasional and desired intervals to facilitate the separation of the whey.

Fifth: The separation of the whey from the cheese is accomplished without squeezing or compressing the latter which would cause a toughness in the cheese decidedly objectionable to consumers.

In the accompanying drawings, in which like parts are designated by like reference characters throughout the several views:—

Figure 1:
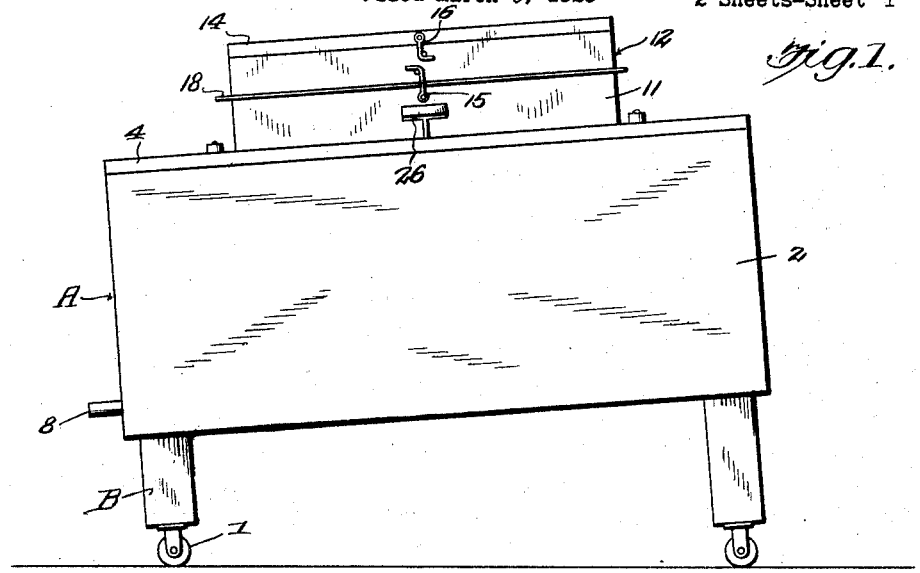
Figure 1 is a side elevation of a cheese vat or drain embodying my improvements.
Figure 2:
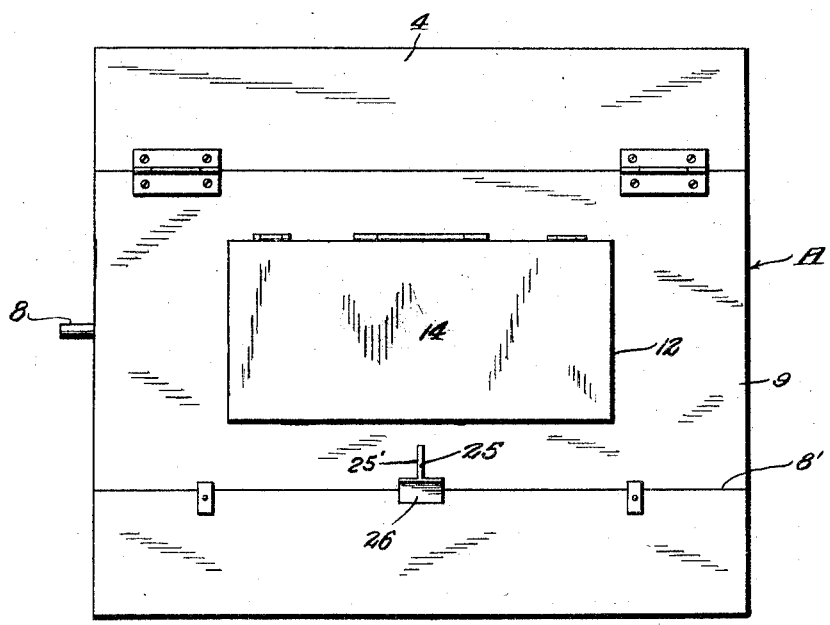
Figure 2 is a plan view thereof.
Figure 4:
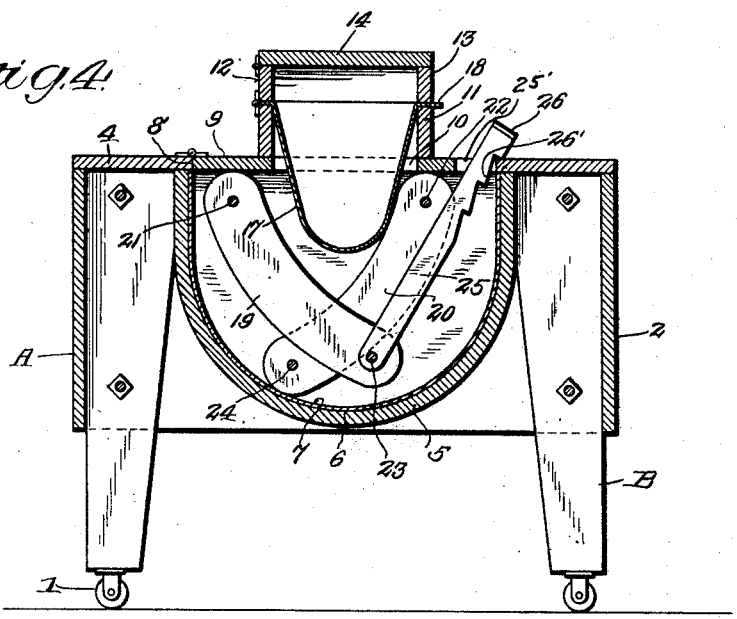
Figure 3:
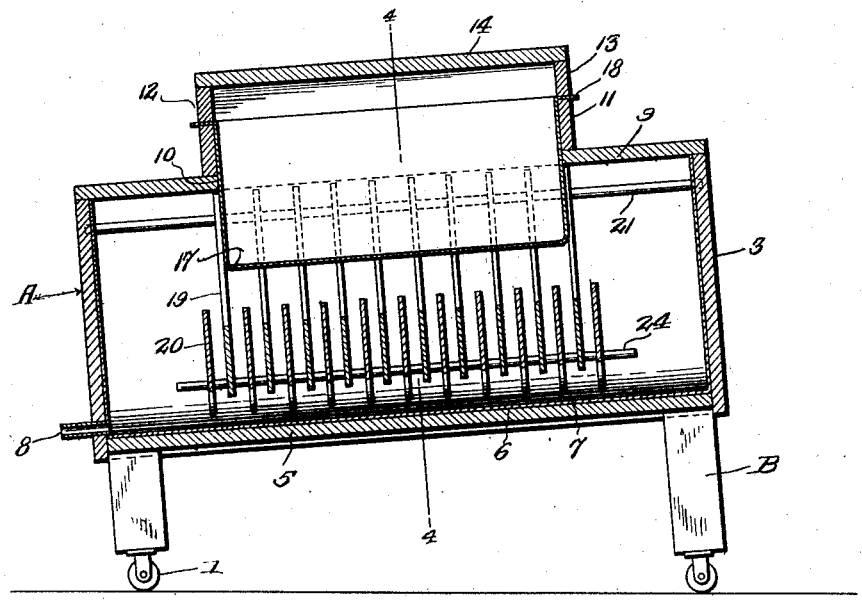
Figure 3 is a central longitudinal section.

Figure 4 a vertical transverse section, taken on line 4—4 of Figure 3.

Referring to the drawings for a more particular description of my invention and in which drawings like parts are designated by like reference characters throughout the several views, my device comprises a substantially rectangular oblong vat or casing A mounted at its four corners upon the upright supporting legs B equipped at their lower ends with suitable rollers 1. The vat or casing A comprises the straight side and end walls 2 and 3, respectively, the flat top 4 and the central depending trough-like portion 5 which is of approximately semi-circular form in cross section and extends the full length of the casing, being completely housed or encased at the top, sides and ends by the latter. In my present construction, the trough is formed with a smooth inner wall 6 having a suitable acid-resisting lining 7. The trough is also provided at one end with a suitable drain, as 8, for the whey.

The top of the casing A is provided directly over the trough-like portion 5, with a central opening 8' which extends the full length of the casing and is normally closed by the flat hinged cover 9. The cover 9 is provided with a central longitudinally disposed rectangular oblong opening 10, surrounded by the lower fixed section 11 of an upstanding rectangular oblong housing 12 whose upper hinged section 13 is provided with a hinged top or cover 14. The upper hinged section 13 of housing is held in closed position by a suitable catch 15 and the top or cover 14 held closed by a suitable catch 16. The cheese cloth strip or sack 17 is held in place by clamping its edge 18 between the upper and lower sections of the housing 12 and the sack extends downwardly through the opening 10 into the trough 5. It will be observed that the cheese may be readily introduced in the cheese cloth sack through the top of the housing and that when the cover 14 is closed the upper portion or top of the sack is completely encased and flies, dirt or other foreign matter entirely excluded.

In order to facilitate the separation of the whey from the cheese, it is desirable to slightly raise the bottom of the cheese cloth sack together with its contents at occasional intervals and without squeezing or compressing the cheese and producing toughness which is decidedly objectionable to the consumer. This is accomplished by employing two series of flat oppositely disposed arcuate links 19 and 20 hingedly connected at their upper ends to the horizontal longitudinally disposed stationary rods 21 and 22 and connected together at their lower ends by the lower horizontal rods 23 and 24, respectively, the links being arranged with the lower ends of one series overlapping and alternating with those of the opposite series, as clearly shown in Figures 3 and 4 of the drawings. It will be noted that the rod 23 works against the lower ends and outer edges of the arcuate links 20. Consequently, by exerting a pull on the vertically disposed bar 25 which is connected with the rod 23, the links 19 are not only raised, but the opposite series of links 20 are simultaneously raised as well, by virtue of the fact that the arc described by the rod 23 is eccentric to the curvature of the outer edges of the latter and such as to swing the lower ends of the links 20 upwardly. The upper end of the bar 25 extends through an opening 25' in the cover, is provided with a suitable handle 26 and is formed with a longitudinal series of notches 26', any one of which is adapted to be hooked over or engaged with one edge of the top of the casing A and secure the links 19 and 20 in adjusted position.

From the foregoing description taken in connection with the drawings, it is thought that the construction, operation and advantages of my invention will be readily understood without requiring a more extended explanation.

Having described my invention, what I claim as new and desire to secure by Letters Patent, is:—

1. A cottage cheese vat comprising a casing having a depending trough-like portion, a cheese cloth sack supported upon the casing and extending into the trough, an upstanding housing having a hinged upper section, enclosing the upper portion of the sack and manually operated means for raising the bottom of the sack at desired intervals to facilitate the separation of the whey from the cheese.

2. A cottage cheese vat comprising a casing having a depending trough-like portion, a cheese cloth sack supported upon the casing and extending into the trough, an upstanding housing having a hinged upper section, enclosing the upper portion of the sack, manually operated means for raising the bottom of the sack at desired intervals to facilitate the separation of the whey from the cheese, and supporting legs for the casing.

3. A cottage cheese vat comprising a casing having a depending trough-like portion and a central opening in its top over said trough, an upstanding housing covering said central opening, said housing comprising a lower fixed section and an upper hinged section, a cheese cloth sack supported in place by having its upper edge clamped between the upper and lower sections of the housing, the bottom of the sack extending through the central opening in the top of the casing into the trough, a hinged cover for the upper hinged section of the housing and manually operated means for raising the bottom of the sack at desired intervals to facilitate the separation of the whey from the cheese.

4. A cottage cheese vat comprising a casing having a central depending trough, a cheese cloth sack supported upon the casing and depending into the trough and manually operated means for raising the bottom of the sack to facilitate the separation of the whey from the cheese, said means comprising two series of oppositely disposed arcuate links hinged at their upper ends in the trough and arranged with the lower ends of the links of one series overlapping and alternating with those of the opposite series, a horizontal rod extending through the lower ends of each series of links, the rod of one series adapted to work against the outer edges of the links of the other series and movable in an arc eccentric to the curvature of the latter and a bar connected with said last mentioned rod.

5. A cottage cheese vat comprising a casing having a central depending trough, a cheese cloth sack supported upon the casing and depending into the trough and manually operated means for raising the bottom of the sack to facilitate the separation of the whey from the cheese, said means comprising two series of oppositely disposed arcuate links hinged at their upper ends in the trough and arranged with the lower ends of the links of one series overlapping and alternating with those of the opposite series, a horizontal rod extending through the lower ends of each series of links, the rod of one series adapted to work against the outer edges of the links of the other series and movable in an arc eccentric to the curvature of the latter and a bar connected with said last mentioned rod, the free end of said bar provided with a handle and formed with a series of notches adapted to engage a suitable support.

In testimony whereof, he affixes his signature.

FREDRICK C. TISCHHAUSER.